(12) United States Patent
Scaroni et al.

(10) Patent No.: US 9,221,186 B2
(45) Date of Patent: Dec. 29, 2015

(54) PRODUCE PROCESSING APPARATUS

(76) Inventors: David W. Scaroni, Heber, CA (US); Matthew S. Scaroni, Heber, CA (US)

( * ) Notice: Subject to any disclaimer, the term of this patent is extended or adjusted under 35 U.S.C. 154(b) by 727 days.

(21) Appl. No.: 12/948,605

(22) Filed: Nov. 17, 2010

(65) Prior Publication Data

US 2011/0081463 A1  Apr. 7, 2011

Related U.S. Application Data

(63) Continuation-in-part of application No. 12/421,498, filed on Apr. 9, 2009, now abandoned.

(51) Int. Cl.
| | | |
|---|---|---|
| *A23F 5/00* | (2006.01) |
| *A23L 1/00* | (2006.01) |
| *B26D 7/14* | (2006.01) |
| *B26D 1/143* | (2006.01) |
| *B26D 3/26* | (2006.01) |
| *A23N 15/00* | (2006.01) |
| *B26D 7/06* | (2006.01) |

(52) U.S. Cl.
CPC ............. *B26D 7/14* (2013.01); *A23N 15/003* (2013.01); *B26D 1/143* (2013.01); *B26D 3/26* (2013.01); *B26D 7/0625* (2013.01); *Y10T 83/654* (2015.04); *Y10T 83/6579* (2015.04)

(58) Field of Classification Search
CPC ........... A47J 43/00; A47J 43/26; A47J 21/00; A47J 23/00; A47J 25/00; A23N 5/00; A23N 5/004; A23N 5/006; A23N 5/008; A23N 5/01; A23N 5/03; A23N 5/08; A23N 4/00; A23N 4/02; A23N 4/04; A23N 4/06; A23N 4/08; A23N 4/085; A23N 4/10; A23N 4/12; A23N 4/14; A23N 4/16; A23N 4/18; A23N 4/20; A23N 4/22; A23N 4/24; A23N 7/00; A23N 7/002; A23N 7/005; A23N 2007/007; A23N 7/01; A23N 7/02; A23N 7/023; A23N 7/026; A23N 7/04; A23N 7/08; A23N 7/10; A23N 15/02; A23N 15/003; A23N 15/025; A23N 15/06; A01D 46/285; A24B 15/284
USPC ........... 99/535, 537–539, 546, 626, 627, 635; 56/12.4, 12.5; 171/8, 30, 40–42; 426/302
See application file for complete search history.

(56) References Cited

U.S. PATENT DOCUMENTS

| | | | | |
|---|---|---|---|---|
| 1,031,669 | A * | 7/1912 | Twamley | 356/432 |
| 1,861,084 | A * | 5/1932 | Goranson et al. | 99/541 |
| 2,141,806 | A * | 12/1938 | Zielesch | 56/121.4 |
| 2,158,545 | A * | 5/1939 | Kieweg | 99/553 |

(Continued)

*Primary Examiner* — Eric Stapleton
(74) *Attorney, Agent, or Firm* — Kali Law Group P.C.

(57) ABSTRACT

Produce processing apparatuses are presented including: a number of paddles coupled with a rotating conveyor system configured for capturing and securing produce along a first position; a counter-rotating compression belt system for compressing the produce along a second position, where the counter-rotating compression belt system is configured to apply a compressive force to the produce such that the produce is secured, and where the counter-rotating compression belt system includes a belt that is counter-rotating and synchronized with respect to the rotating conveyor system; and a cutting system including a rotary coring blade assembly positioned along a path of the rotating conveyor system, where the rotary coring blade assembly is positioned and configured to core the produce along a third position.

15 Claims, 10 Drawing Sheets

(56) References Cited

U.S. PATENT DOCUMENTS

| | | | | |
|---|---|---|---|---|
| 2,187,326 A | * | 1/1940 | Nicoll et al. | 99/563 |
| 2,232,208 A | * | 2/1941 | Carroll | 99/486 |
| 2,232,209 A | * | 2/1941 | Carroll | 99/549 |
| 2,236,002 A | * | 3/1941 | Lederer | 56/14.6 |
| 2,299,137 A | * | 10/1942 | Geren et al. | 99/544 |
| 2,300,773 A | * | 11/1942 | Carroll | 99/635 |
| 2,456,372 A | * | 12/1948 | Buechek | 426/297 |
| 2,649,878 A | * | 8/1953 | Coons | 99/627 |
| 3,101,042 A | * | 8/1963 | Good | 99/487 |
| 3,197,647 A | * | 7/1965 | Fraenkel | 250/225 |
| 3,199,558 A | * | 8/1965 | Anderson et al. | 99/545 |
| 3,216,567 A | * | 11/1965 | Kelly et al. | 209/571 |
| 3,380,500 A | * | 4/1968 | Alpen | 99/637 |
| 3,382,900 A | * | 5/1968 | De Back | 99/542 |
| 3,455,445 A | * | 7/1969 | Allen et al. | 209/544 |
| 3,478,794 A | * | 11/1969 | Alpen | 99/637 |
| 3,478,795 A | * | 11/1969 | Thornsbery | 99/639 |
| 3,581,888 A | * | 6/1971 | Kelly et al. | 209/565 |
| 3,646,977 A | * | 3/1972 | Goodale | 99/635 |
| 3,690,049 A | * | 9/1972 | Roberson et al. | 56/13.9 |
| 3,695,323 A | * | 10/1972 | Akesson et al. | 99/637 |
| 3,724,470 A | * | 4/1973 | Wilson | 132/212 |
| 3,871,774 A | * | 3/1975 | Murata | 356/432 |
| 3,886,857 A | * | 6/1975 | Goodale | 99/563 |
| 3,907,101 A | * | 9/1975 | Tomelleri | 198/375 |
| 3,952,646 A | * | 4/1976 | Leban | 99/639 |
| 3,956,636 A | * | 5/1976 | Williams | 250/559.4 |
| 4,038,426 A | * | 7/1977 | Jespersen et al. | 426/266 |
| 4,041,672 A | * | 8/1977 | Gularte | 53/399 |
| 4,095,391 A | * | 6/1978 | Anguiano | 53/515 |
| 4,127,193 A | * | 11/1978 | Richardson | 209/539 |
| 4,161,366 A | * | 7/1979 | Bol et al. | 356/56 |
| 4,168,642 A | * | 9/1979 | Evans | 83/404.3 |
| 4,176,750 A | * | 12/1979 | Holmes | 171/28 |
| 4,196,811 A | * | 4/1980 | Pilesi et al. | 209/588 |
| 4,211,161 A | * | 7/1980 | Jourdan et al. | 99/638 |
| 4,287,820 A | * | 9/1981 | Urban | 99/538 |
| 4,348,855 A | * | 9/1982 | DePauw et al. | 460/1 |
| 4,371,081 A | * | 2/1983 | Satake | 209/580 |
| 4,412,483 A | * | 11/1983 | Hoegh | 99/538 |
| 4,420,118 A | * | 12/1983 | Gehlen | 241/101.2 |
| 4,441,513 A | * | 4/1984 | Herwig | 460/1 |
| 4,455,929 A | * | 6/1984 | Goudarzi et al. | 99/637 |
| 4,480,536 A | * | 11/1984 | Burns | 100/6 |
| 4,572,666 A | * | 2/1986 | Satake | 356/239.1 |
| 4,601,156 A | * | 7/1986 | Parry et al. | 53/399 |
| 4,658,714 A | * | 4/1987 | McIlvain et al. | 99/637 |
| 4,666,045 A | * | 5/1987 | Gillespie et al. | 209/585 |
| 4,674,270 A | * | 6/1987 | Tonus | 53/556 |
| 4,699,273 A | * | 10/1987 | Suggi-Liverani et al. | 209/580 |
| 4,713,781 A | * | 12/1987 | Brizgis et al. | 382/110 |
| 4,752,689 A | * | 6/1988 | Satake | 250/339.07 |
| 4,773,324 A | * | 9/1988 | Wylie et al. | 99/638 |
| 4,806,764 A | * | 2/1989 | Satake | 250/339.07 |
| 5,009,909 A | * | 4/1991 | Hirtle et al. | 426/481 |
| 5,138,940 A | * | 8/1992 | Geissler et al. | 99/538 |
| 5,168,801 A | * | 12/1992 | Switek, Jr. | 99/546 |
| 5,174,181 A | * | 12/1992 | Julian et al. | 83/24 |
| 5,181,458 A | * | 1/1993 | Plant et al. | 99/538 |
| 5,245,188 A | * | 9/1993 | Satake et al. | 250/341.7 |
| 5,252,240 A | * | 10/1993 | Eusebi | 252/76 |
| 5,376,047 A | * | 12/1994 | Harden et al. | 460/121 |
| 5,410,955 A | * | 5/1995 | Paterson et al. | 99/543 |
| 5,448,069 A | * | 9/1995 | Tobler et al. | 250/339.01 |
| 5,470,602 A | * | 11/1995 | Cecil | 426/481 |
| 5,524,746 A | * | 6/1996 | Massen et al. | 198/443 |
| 5,659,624 A | * | 8/1997 | Fazzari et al. | 382/110 |
| 5,669,511 A | * | 9/1997 | Satake et al. | 209/580 |
| 5,733,592 A | * | 3/1998 | Wettstein et al. | 426/416 |
| 5,780,088 A | * | 7/1998 | Zittel et al. | 426/483 |
| 5,865,111 A | * | 2/1999 | Hanson | 99/637 |
| 5,865,990 A | * | 2/1999 | Novak et al. | 209/579 |
| 5,924,271 A | * | 7/1999 | Truffaux | 56/327.1 |
| 5,973,286 A | * | 10/1999 | Wan | 209/582 |
| 6,036,989 A | * | 3/2000 | Ellis | 426/484 |
| 6,059,117 A | * | 5/2000 | Novak et al. | 209/10 |
| 6,119,442 A | * | 9/2000 | Hale | 56/10.2 H |
| 6,237,475 B1 | * | 5/2001 | Ascari et al. | 99/543 |
| 6,252,188 B1 | * | 6/2001 | Zapata et al. | 209/577 |
| 6,368,649 B1 | * | 4/2002 | van Bommel | 426/482 |
| 6,382,394 B1 | * | 5/2002 | Matsushita et al. | 198/395 |
| 6,449,932 B1 | * | 9/2002 | Cooper et al. | 56/10.2 R |
| 6,526,120 B1 | * | 2/2003 | Gray et al. | 378/57 |
| 6,607,769 B1 | * | 8/2003 | Krymskiy et al. | 426/484 |
| 6,736,041 B2 | * | 5/2004 | Portnoy | 83/404.1 |
| 6,814,994 B2 | * | 11/2004 | Blasco Piquer et al. | 426/482 |
| 6,882,434 B1 | * | 4/2005 | Sandberg et al. | 356/601 |
| 6,966,162 B2 | * | 11/2005 | Viaud et al. | 53/64 |
| 6,996,964 B2 | * | 2/2006 | Maconachy et al. | 56/327.1 |
| 7,008,366 B1 | * | 3/2006 | Aitkenhead et al. | 494/18 |
| 7,062,899 B2 | * | 6/2006 | Maconachy et al. | 56/327.1 |
| 7,335,847 B2 | * | 2/2008 | Drewes et al. | 209/587 |
| 7,367,880 B2 | * | 5/2008 | Hoskinson et al. | 460/5 |
| 7,450,247 B2 | * | 11/2008 | Sandberg et al. | 356/601 |
| 7,452,323 B2 | * | 11/2008 | Aitkenhead et al. | 494/45 |
| 7,540,129 B2 | * | 6/2009 | Kormann | 56/10.2 E |
| 7,623,249 B2 | * | 11/2009 | Sandberg et al. | 356/601 |
| 7,721,637 B2 | * | 5/2010 | Bucks | 83/663 |
| 7,887,865 B2 | * | 2/2011 | Knorr et al. | 426/484 |
| 7,906,162 B2 | * | 3/2011 | Woelfel | 426/289 |
| 8,047,381 B2 | * | 11/2011 | Koyama et al. | 209/539 |
| 8,061,527 B2 | * | 11/2011 | Koyama et al. | 209/539 |
| 8,100,268 B2 | * | 1/2012 | Deefholts | 209/655 |
| 8,216,120 B2 | * | 7/2012 | Aitkenhead et al. | 494/45 |
| 8,247,724 B2 | * | 8/2012 | Mills et al. | 209/576 |
| 8,336,434 B2 | * | 12/2012 | Sandberg et al. | 83/364 |
| 8,387,522 B2 | * | 3/2013 | Rusko et al. | 99/540 |
| 2005/0126144 A1 | * | 6/2005 | Koselka et al. | 56/10.2 R |
| 2005/0204717 A1 | * | 9/2005 | Colens | 56/344 |
| 2006/0021317 A1 | * | 2/2006 | Costa et al. | 56/327.1 |
| 2006/0213167 A1 | * | 9/2006 | Koselka et al. | 56/10.2 A |
| 2007/0095041 A1 | * | 5/2007 | de Groot et al. | 56/13.5 |
| 2007/0214763 A1 | * | 9/2007 | Nash et al. | 56/327.1 |
| 2007/0221072 A1 | * | 9/2007 | de Groot et al. | 99/537 |
| 2008/0022828 A1 | * | 1/2008 | Bucks | 83/591 |
| 2008/0245243 A1 | * | 10/2008 | Rusko et al. | 99/537 |
| 2009/0044505 A1 | * | 2/2009 | Huster et al. | 56/10.2 R |
| 2009/0145272 A1 | * | 6/2009 | Sandberg et al. | 83/13 |
| 2009/0173196 A1 | * | 7/2009 | Lindee et al. | 83/13 |

* cited by examiner

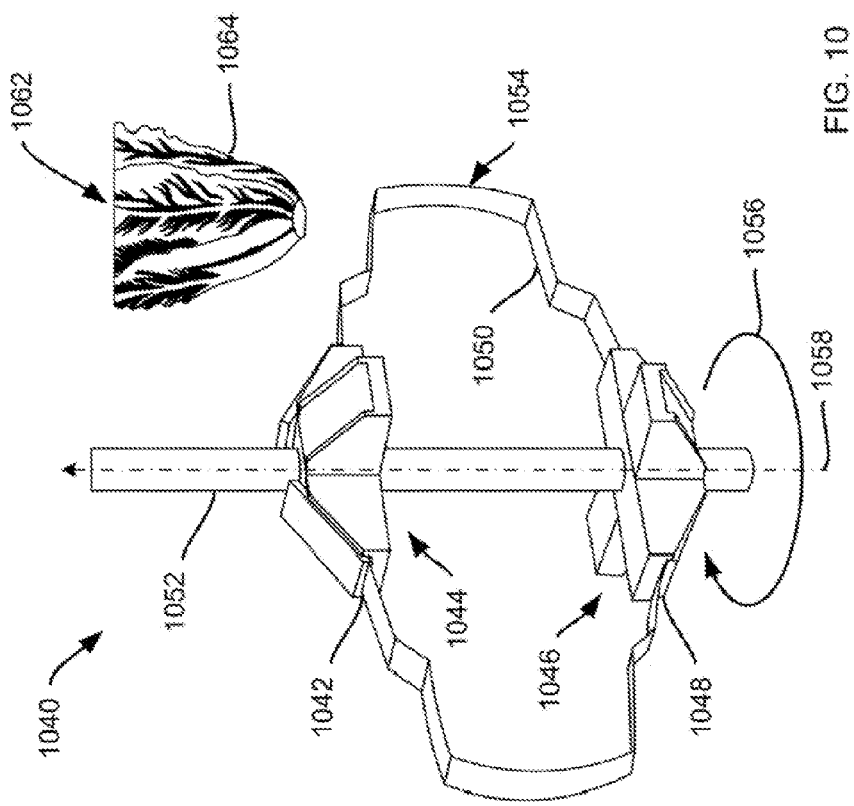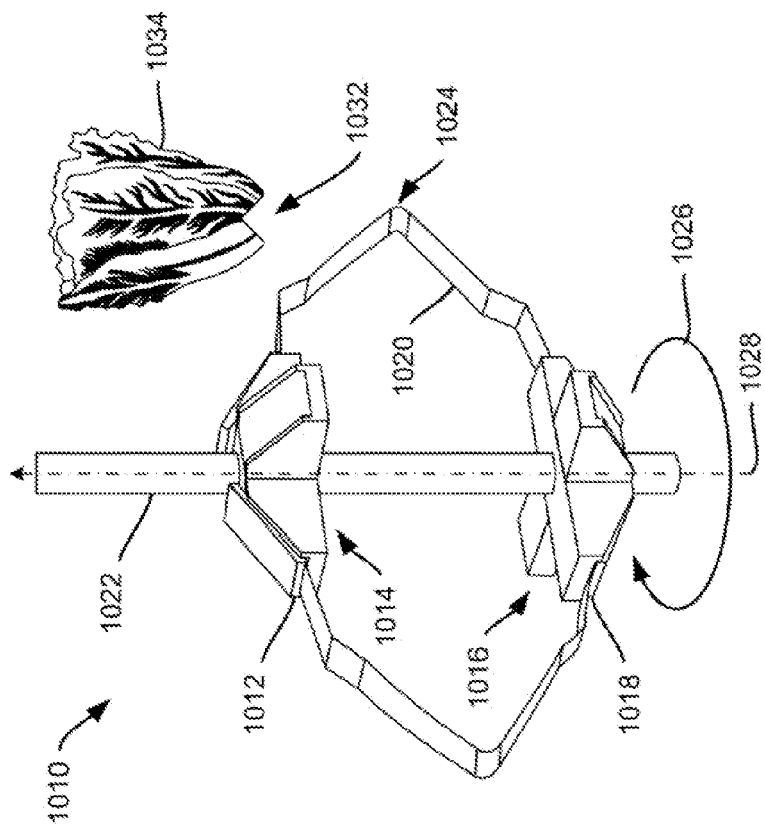

PRODUCE PROCESSING APPARATUS

PRIORITY CLAIM TO CO-PENDING APPLICATION

A claim for priority is hereby made under the provisions of 35 U.S.C. §120 for the present application, which is a continuation-in-part of U.S. application Ser. No. 12/421,498, filed on Apr. 9, 2009, which is incorporated herein by reference.

BACKGROUND

Embodiments of the present invention relate to methods and apparatus for harvesting produce. In particular, methods may be utilized for automated trimming and coring operations.

Modern farming techniques provide many automated methods for harvesting produce. Automated methods have resulted in more efficient utilization of farming resources. For example, automated methods have increased uniformity and quality in produce processing while simultaneously reducing the number of personnel required for accomplishing that production. As a result of automation, delivery of plentiful and low cost products to market is made possible.

In some farming processes, however, some manual labor is still required. For example, in harvesting delicate produce such as leafy vegetables—hand picking, sorting, and processing is still being utilized in field. In a typical field, numerous personnel are required to maintain harvesting production. As may be appreciated, the costs associated with managing large workforces directly affect market prices. In addition, human error and inconsistency may result, in some examples, in non-uniform production which could adversely affect consumer satisfaction.

At least one problem associated with harvesting delicate produce automatically is that the produce may be easily damaged. For example, lettuce is one type of delicate produce. During production, lettuce must be sufficiently secured without damaging the leaves which is the end product. In many cases, field processing may be desirable to lower overall production costs, however, equipment must be both sufficiently robust to handle field environments as well as sufficiently sensitive to handle produce without damage—two goals which are often in direct opposition with one another.

Another problem in harvesting delicate produce automatically is that selection of viable produce is critical. Typically, a laborer examines a head of lettuce to determine whether the produce is viable as a market product. The laborer may then accept or reject the produce before harvesting. However, viability is necessarily a subjective assessment and is thus continually subject to human error. As may be appreciated, these errors may lead either to non-viable product reaching market, or viable product being lost in the field.

As such produce processing apparatus are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, produce processing apparatuses are presented including: a number of paddles coupled with a rotating conveyor system configured for capturing and securing produce along a first position; a counter-rotating compression belt system for compressing the produce along a second position, where the counter-rotating compression belt system is configured to apply a compressive force to the produce such that the produce is secured, and where the counter-rotating compression belt system includes a belt that is counter-rotating and synchronized with respect to the rotating conveyor system; and a cutting system including a rotary coring blade assembly positioned along a path of the rotating conveyor system, where the rotary coring blade assembly is positioned and configured to core the produce along a third position. In some embodiments, the rotary coring blade assembly further includes: at least one coring blade, the at least coring blade including a core blade edge aligned along a core blade leading edge of a first portion of the at least one coring blade, where the first portion is formed to provide a first coring shape to core the produce; a first proximal attachment point for attaching the at least one coring blade with a rotatable coring shaft; and a first distal attachment point for attaching the at least one coring blade with the rotatable coring shaft, where the rotatable coring shaft includes a number of coupling members for removably securing the at least one coring blade at the first proximal attachment point and the first distal attachment point. In some embodiments, the cutting system further includes: a coring drive in mechanical communication with the rotatable coring shaft for driving the at least one cutting blade through a rotational path. In some embodiments, a coring counterweight coupled with the rotatable coring shaft for balancing the cutting system when only one coring blade is utilized. In some embodiments, a second of the at least one coring blade is formed to provide a second coring shape selected from the group consisting of: a similar coring shape, a dissimilar coring shape, and a complimentary coring shape. In some embodiments, the first coring shape and the second coring shape is a shape such as a vee shape, an arcuate shape, a semi-arcuate shape, a rectangular shape, and a semi-rectangular shape. In some embodiments, apparatuses further include: a rotary trimming blade assembly positioned along the path of the rotating conveyor system, the rotary trimming blade assembly including, at least one trimming blade, where the at least one trimming blade further includes: at least one trim blade edge aligned along a trim blade leading edge of a second portion of the at least one trimming blade, where the second portion is formed to provide a first trimming shape to trim the produce, a second proximal attachment point for attaching the at least one trimming blade with a rotatable trimming shaft, and a second distal attachment point for attaching the at least one trimming blade with the rotatable trimming shaft, where the rotatable trimming shaft includes a number of coupling members for securing the at least one trimming blade at the second proximal attachment point and the second distal attachment point. In some embodiments, the produce includes a romaine lettuce head, an iceberg lettuce head, a butterhead lettuce head, a summertime lettuce head, a cabbage head, a bok choy head, an escarole lettuce head, a radicchio lettuce heat, a broccoli head, a cauliflower head, a broccoflower head, a celery bunch, and a carrot bunch. In some embodiments, apparatuses further include: a rinse system along a fourth position for rinsing a trimmed and cored produce, where the rinse system includes a rinse selected from the group consisting of: a water rinse, a saline rinse, a chemical rinse, and an air rinse. In some embodiments, apparatuses further include: a first optical detection device along the first position for detecting viability of the produce, the optical detection device configured to function in coordination with a first produce rejection system along the first position, where the produce is removed from the rotating conveyor system if the produce is not viable. In some embodiments, apparatuses further include: a second optical detection device along fourth position for detecting viability of the produce, the optical detection device configured to function in coordination with a second produce rejection system where the produce is removed from the rotating conveyor system if the produce is not viable.

In other embodiments, methods for coring and trimming produce are presented, the methods including: receiving severed produce on a rotating conveyor system along a first position, the rotating conveyor system including a number of paddles for capturing and securing the severed produce; compressing the severed produce with a counter-rotating compression belt system configured to apply a compressive force to the severed produce such that the severed produce is secured; and transporting the severed produce through a cutting system including, the cutting system including, at least one coring blade positioned along a path of the rotating conveyor system, where the at least one coring blade is positioned and configured to core the severed produce along a second position, and at least one trimming blade positioned along the path of the rotating conveyor system, where the at least one trimming blade is positioned and configured to trim the severed produce along a third position; and releasing a cored and trimmed produce to a collection point. In some embodiments, the at least one coring blade further includes: at least one core blade edge aligned along a core blade leading edge of a first portion of the at least one coring blade, where the first portion is formed to provide a first coring shape to core the produce; a first proximal attachment point for attaching the at least one coring blade with a rotatable coring shaft; and a first distal attachment point for attaching the at least one coring blade with the rotatable coring shaft, where the rotatable coring shaft includes a number of coupling members for removably securing the at least one coring blade at the first proximal attachment point and the first distal attachment point, and where the at least one trimming blade further includes: at least one trim blade edge aligned along a trim blade leading edge of a second portion of the at least one trimming blade, where the second portion is formed to provide a first trimming shape to trim the produce; a second proximal attachment point for attaching the at least one trimming blade with a rotatable trimming shaft; and a second distal attachment point for attaching the at least one trimming blade with the rotatable trimming shaft, where the rotatable trimming shaft includes a number of coupling members for securing the at least one trimming blade at the second proximal attachment point and the second distal attachment point. In some embodiments, methods further include aligning the severed produce with the rotating conveyor system along the first position. In some embodiments, methods further include optically detecting viability of the severed produce before the compressing the severed produce; and rejecting the severed produce if the severed produce is not viable. In some embodiments, methods further include optically detecting viability of the trimmed and cored produce after the transporting the severed produce through a cutting system; and rejecting the trimmed and cored produce if the trimmed and cored produce is not viable. In some embodiments, methods further include rinsing the trimmed and cored severed produce, where the rinsing includes: a water rinse, a saline rinse, a chemical rinse, and an air rinse.

In other embodiments, produce processing apparatuses are presented including: a number of annular cups coupled with a rotating conveyor system configured for capturing and securing produce along a first position; a cutting system including a rotary coring blade assembly positioned along a path of the rotating conveyor system, where the rotary coring blade assembly is positioned and configured to core the produce along a second position a rotary trimming blade assembly positioned along the path of the rotating conveyor system, where the rotary trimming blade assembly is positioned and configured to core the produce along a third position. In some embodiments, the rotary coring blade assembly further includes: at least one coring blade, the at least coring blade including a core blade edge aligned along a core blade leading edge of a first portion of the at least one coring blade, where the first portion is formed to provide a coring shape to core the produce; a first proximal attachment point for attaching the at least one coring blade with a rotatable coring shaft; and a first distal attachment point for attaching the at least one coring blade with the rotatable coring shaft, where the rotatable coring shaft includes a number of coupling members for removably securing the at least one coring blade at the first proximal attachment point and the first distal attachment point, and where the rotary trimming blade assembly further includes: at least one trim blade edge aligned along a trim blade leading edge of a second portion of the at least one trimming blade, where the second portion is formed to provide a trimming shape to trim the produce, a second proximal attachment point for attaching the at least one trimming blade with a rotatable trimming shaft, and a second distal attachment point for attaching the at least one trimming blade with the rotatable trimming shaft, where the rotatable trimming shaft includes a number of coupling members for securing the at least one trimming blade at the second proximal attachment point and the second distal attachment point.

In other embodiments, methods for processing produce are presented, the methods including: receiving severed produce on a rotating conveyor system along a first position, the rotating conveyor system including a number of annular cups for capturing and securing the severed produce; transporting the severed produce through a cutting system including, the cutting system including, at least one coring blade positioned along a path of the rotating conveyor system, where the at least one coring blade is positioned and configured to core the severed produce along a second position, and at least one trimming blade positioned along the path of the rotating conveyor system, where the at least one trimming blade is positioned and configured to trim the severed produce along a third position; and releasing a cored and trimmed produce to a collection point.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10 are illustrative representations of coring and trimming blade assemblies in accordance with embodiments of the present invention;

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
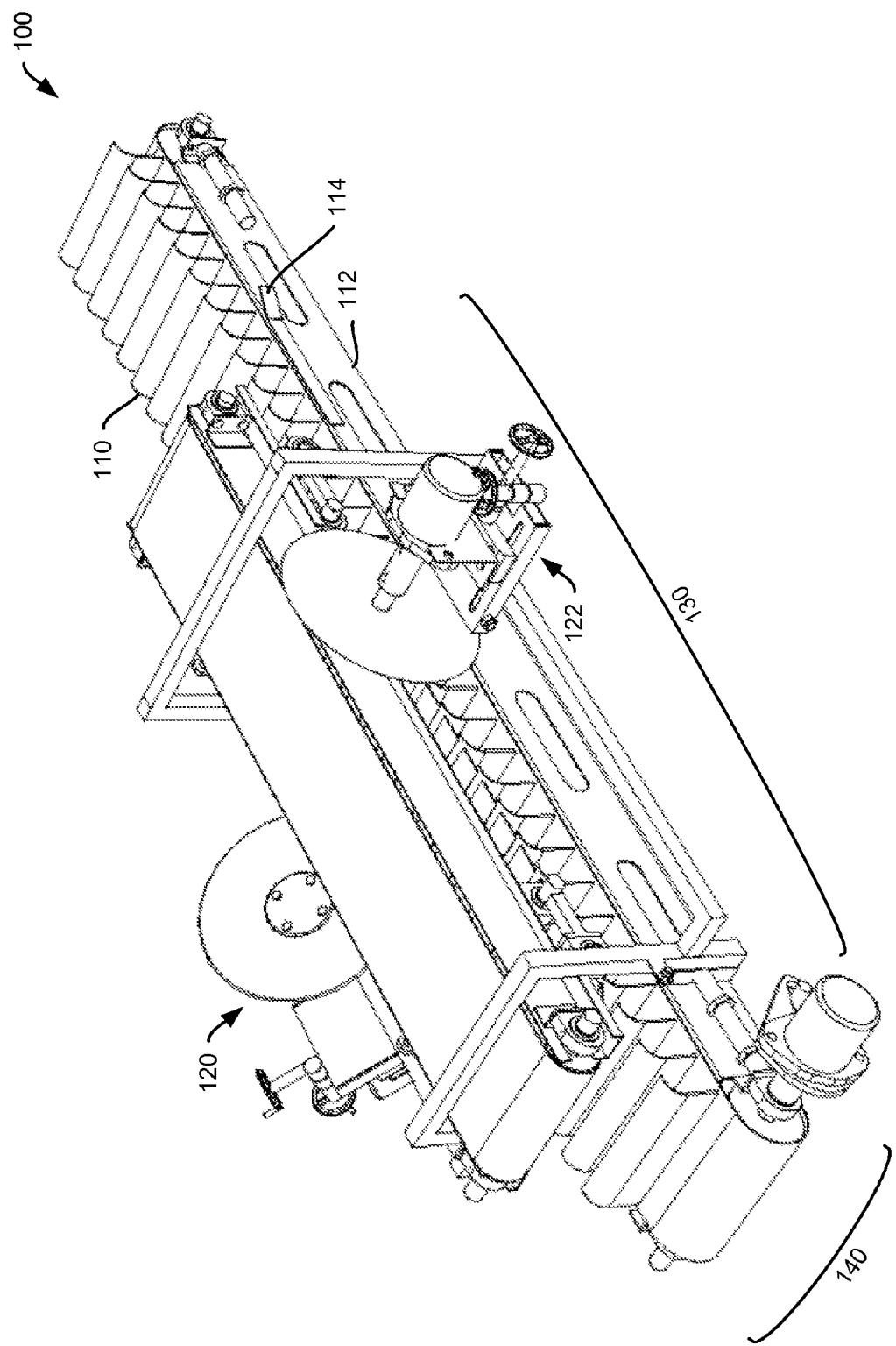
FIG. 1 is an illustrative representation of a perspective view of a produce processing apparatus in accordance with embodiments of the present invention.
Figure 5:
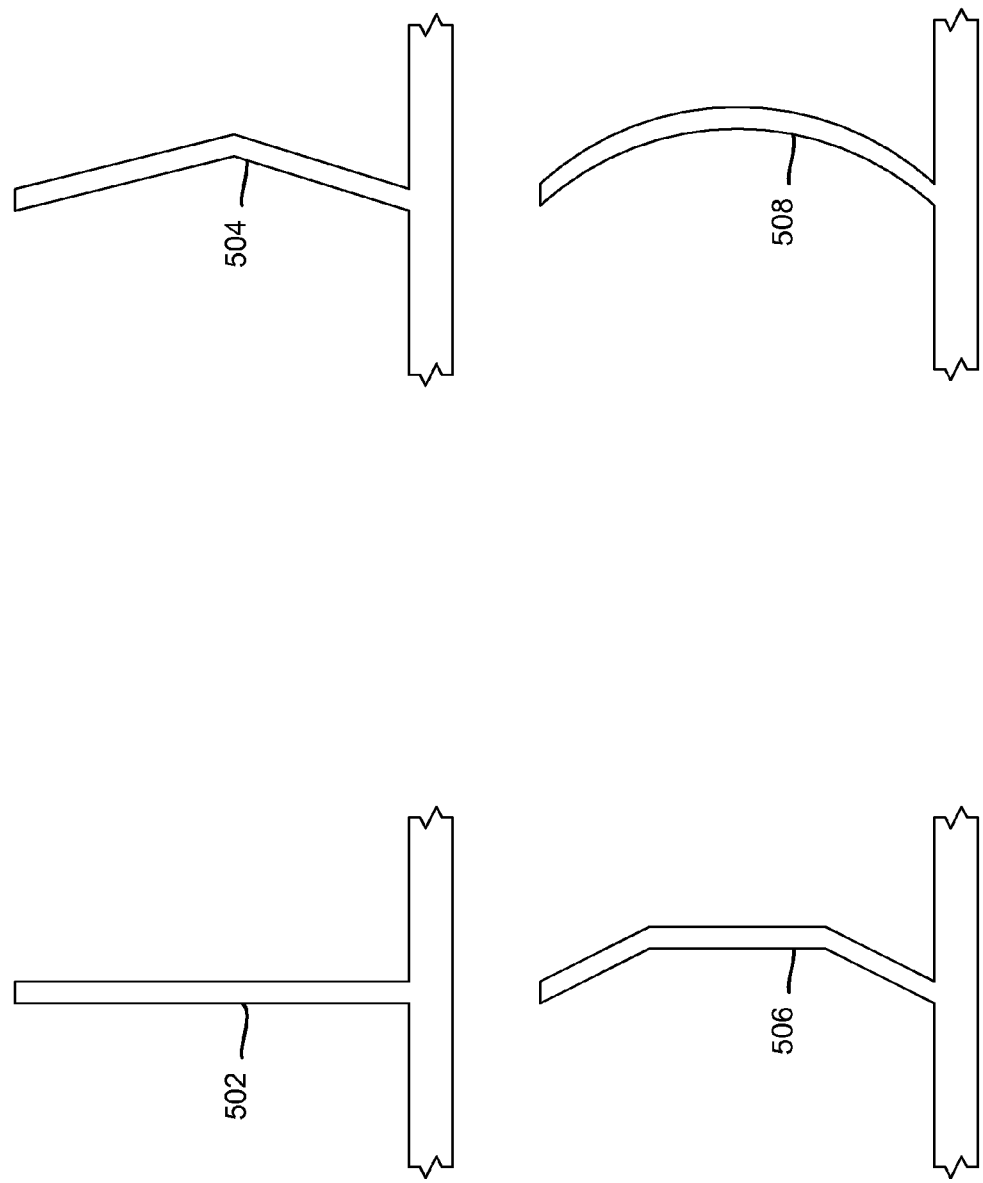
FIG. 5 is an illustrative representation of various paddle shapes in accordance with embodiments of the present invention.

FIG. 1 is an illustrative representation of a perspective view of a produce processing apparatus 100 in accordance with embodiments of the present invention. In particular, FIG. 1 is provided to illustrate the various systems required for processing apparatus 100. As such, processing apparatus 100 includes a plurality of paddles 110 for capturing and securing severed produce. As illustrated, paddles may be configured, in some embodiments, having a semi-arcuate shape. Referring briefly to FIG. 5, which is an illustrative representation of various paddle shapes in accordance with embodiments of the present invention, it may be seen that a variety of shapes may be utilized to capture produce. For example, a planar shape 502, a multi-planar shape 504 and 506, an arcuate shape 508, and a cupped shape (not shown) may be utilized without departing from the present invention. Different shapes of paddles may be desirable in processing different types of produce. For example, in embodiments, produce such as a romaine lettuce head, an iceberg lettuce head, a butterhead lettuce head, a summertime lettuce head, a cabbage head, a bok choy head, an escarole lettuce head, a radicchio lettuce heat, a broccoli head, a cauliflower head, a broccoflower head, a celery bunch, and a carrot bunch may be processed utilizing different shaped paddles without limitation. Furthermore, paddles, as utilized herein, may be manufactured from a flexible or semi-flexible polymeric compound in some embodiments. As may be appreciated, a clean and sanitary environment is desirable in food processing systems. As such, some polymeric compounds, such as polyurethane may be useful in providing a sanitary capture device. In other embodiments, a stainless steel paddle may be provided. It may be noted that the illustrated embodiments in FIG. 5 are provided for clarifying embodiments and should not be construed as limiting with respect to dimension, shape, or material.

Returning to FIG. 1, produce processing apparatus 100 further includes a conveyor system 112, which may be utilized for moving produce the various systems. Any conveyor system known in the art may be utilized without departing from the present invention. In addition, conveyance systems may be powered by drives such as: an internal combustion engine, an electric motor, a compressed air motor, a hydraulic fluid motor, a wind turbine motor, and a power take off (PTO) motor without limitation and without departing from the present invention. Produce processing apparatus 100 may be further configured with alignment bar 114 for aligning a produce head in order to properly and accurately process the produce.

Produce processing apparatus 100 may be further configured with counter-rotating compression belt system 130. Counter-rotating compression belt system 130 may be configured to apply a compressive force to produce in order to secure the produce. Sufficient compressive forces should be applied to secure the produce without damaging the produce. As may be appreciated, different produce will require different compressive force to obtain production objectives. For example, a head of leafy produce may require less compressive force than a head of dense produce such as broccoli. As such, counter-rotating compression belt system 130 may be configured with an adjustment mechanism for adjusting compressive forces in some embodiments. In some embodiments, a compressive force in a range of approximately 1 to 40 pounds of downward force may be applied to produce by counter-rotating compression belt system 130. In addition, it may be desirable, in some embodiments, to increase compressive force on produce to account for loss of produce material during processing. As such, compressive force may be increased from a first compressive force in a range of approximately 1 to 40 pounds of downward force to a second compressive force in a range of approximately 5 to 60 pounds of downward force.

Counter-rotating compression belt system 130 may also be configured to move synchronously with conveyor system 112. Synchronous movement ensures that produce may be stabilized for processing. However, in other embodiments, asynchronous movement may be desired when processing requires some rotation of the produce. In those asynchronous embodiments, one or more counter-rotating compression belt systems may be utilized to alternately stabilize and rotate produce. Belts utilized in counter-rotating compression belt systems may be manufactured from a flexible or semi-flexible polymeric compound in some embodiments. As may be appreciated, a clean and sanitary environment is desirable in food processing systems. As such, some polymeric compounds, such as polyurethane or TEFLON™ may be useful in providing a belt for use in counter-rotating compression belt systems without limitation. In other embodiments, a non-corrosive metal belt such as stainless steel belt may be provided without limitation. In other embodiments, a metal coated belt may be provided without limitation. In still other embodiments, a rubber or rubberized belt may be provided without limitation. As above, counter-rotating compression belt systems may be powered by drives such as: an internal combustion engine, an electric motor, a compressed air motor, a hydraulic fluid motor, a wind turbine motor, and a power take off (PTO) motor without limitation and without departing from the present invention. In some embodiments, counter-rotating compression belt systems may be mechanically linked to conveyor systems by means of a gear box or chain such that coordinated movement of the systems may be readily achieved.

Produce processing apparatus 100 may be further configured with a cutting system including a number of cutting blades 120 and 122 for coring and trimming produce. As illustrated blades 120 and 122 are rotating blades. Rotating blades may have some advantages over other methods of processing because blades may be easily serviced to provide clean coring and trimming. In some embodiments, rotating blades may further include a safety shroud (not shown) in order to provide a safe working environment for operators of produce processing apparatus 100. However, in some embodiments, other methods of coring and trimming may be utilized. For example, in some embodiments, a linear action blade, a static blade, a metal wire blade, a laser blade, and a water blade may be utilized without departing from the present invention. As above, counter-rotating cutting blades may be powered by drives such as: an internal combustion engine, an electric motor, a compressed air motor, a hydraulic fluid motor, a wind turbine motor, and a power take off (PTO) motor without limitation and without departing from the present invention.

Produce processing apparatus 100 may be further configured with a rinse system (not shown). It may be appreciated that rinsing produce after processing may be desirable to remove cull or other debris such as insects and soil. Thus, any rinse system known in the art may be utilized without departing from the present invention. In addition, any type of rinse may be utilized including a water rinse, a saline rinse, a chemical rinse, and an air rinse without departing from the present invention.

As produce production becomes more automated, methods of detecting viable produce may be required. In some embodiments, an optical detection device may be utilized to determine viability. These devices may be used before processing when produce is captured by produce processing apparatus 100, after produce is processed by produce processing apparatus 100, or both in some embodiments. Utilization of an optical detection device may improve and assure quality control in some embodiments. As such, any optical detection device known in the art may be utilized without departing from the present invention. In addition, a produce rejection system may be utilized in coordination with an optical detection device to remove produce from produce processing apparatus when the produce is not viable. In some embodiments, a produce rejection system may mechanically eject produce from the apparatus. In other embodiments, an alarm may inform an operator that produce is not viable. In still other embodiments, a log may be recorded to track rejected produce.

When processing is complete, produce may be released from produce processing apparatus 100 at a collection point 140. At that point, produce may be processed or transported in any number of ways. It may be appreciated that by produce processing apparatus 100 may be utilized in the field or out of field without departing from the present invention. Furthermore, embodiments of produce processing apparatus 100 may be truck mounted, trailer mounted, boom mounted, or tractor mounted without limitation. Still further, embodiments may be utilized in coordination with other automated production machinery such as a harvesting machine without limitation.

Figure 2:
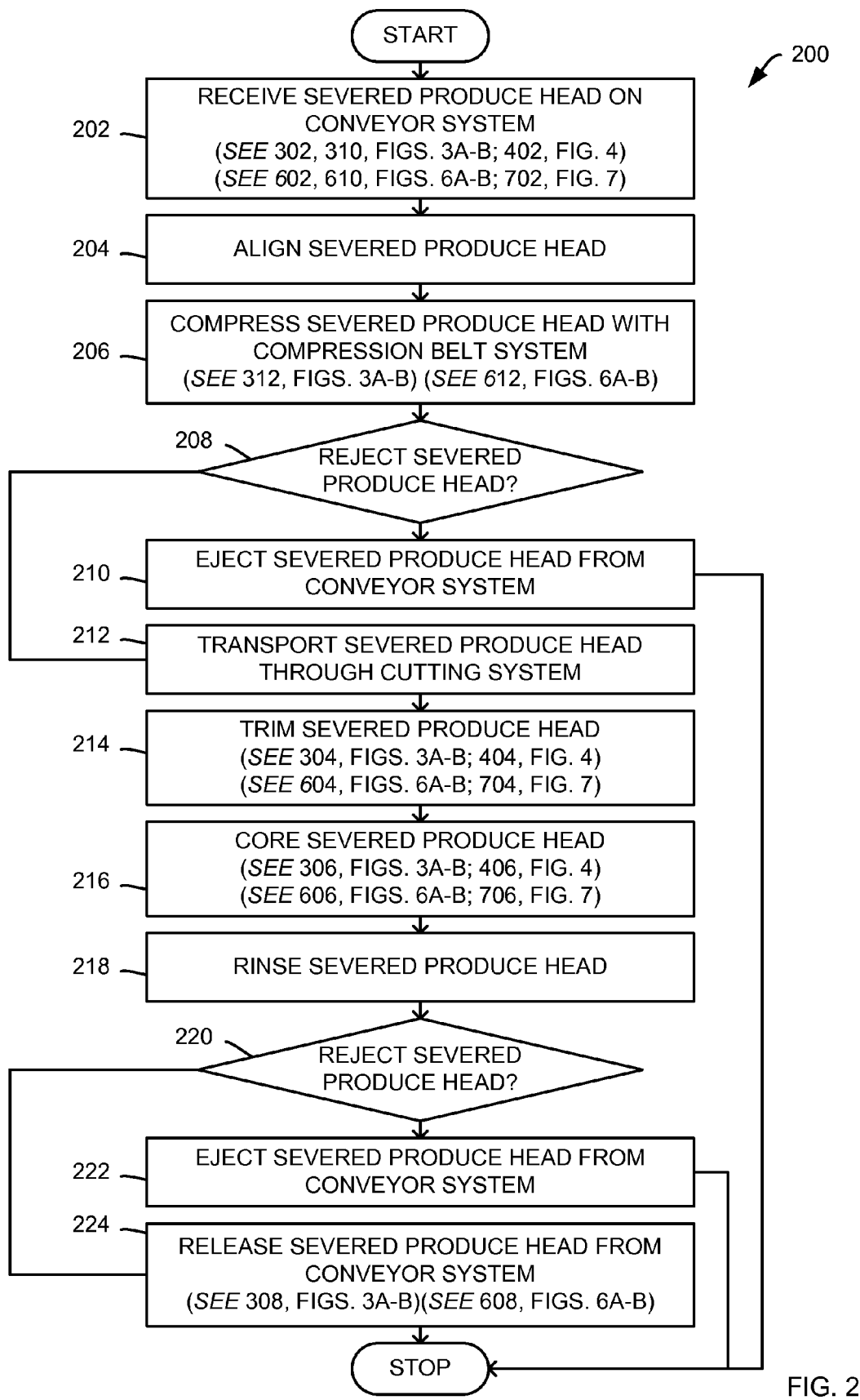
FIG. 2 is an illustrative flowchart of methods for processing produce in accordance with embodiments of the present invention.
Figure 3A:
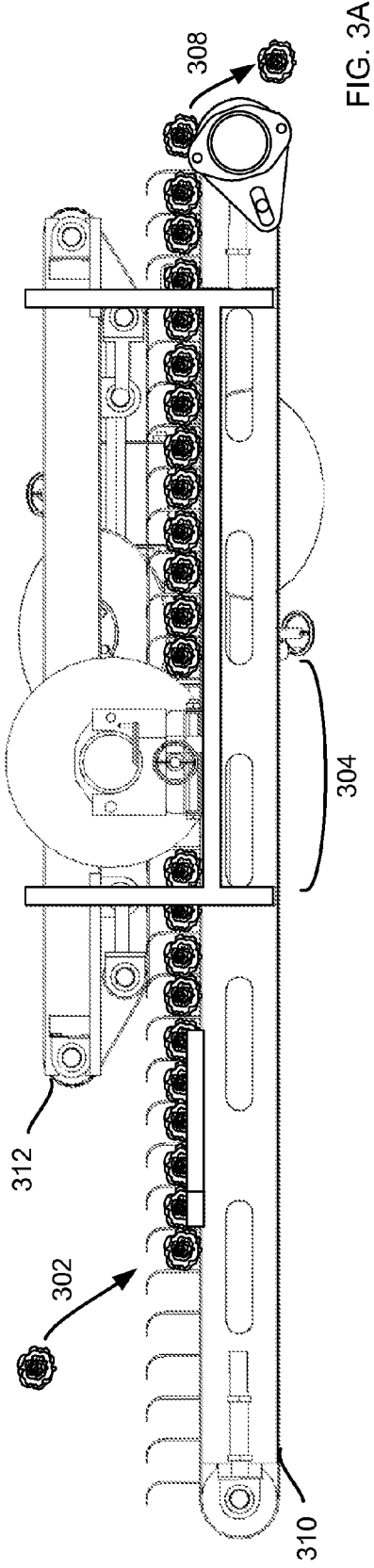
FIGS. 3A-B are illustrative representations of side views of a produce processing apparatus during processing in accordance with embodiments of the present invention.
Figure 4:
FIG. 4 is an illustrative representation of a unit of processed produce in accordance with embodiments of the present invention.
Figure 3B:
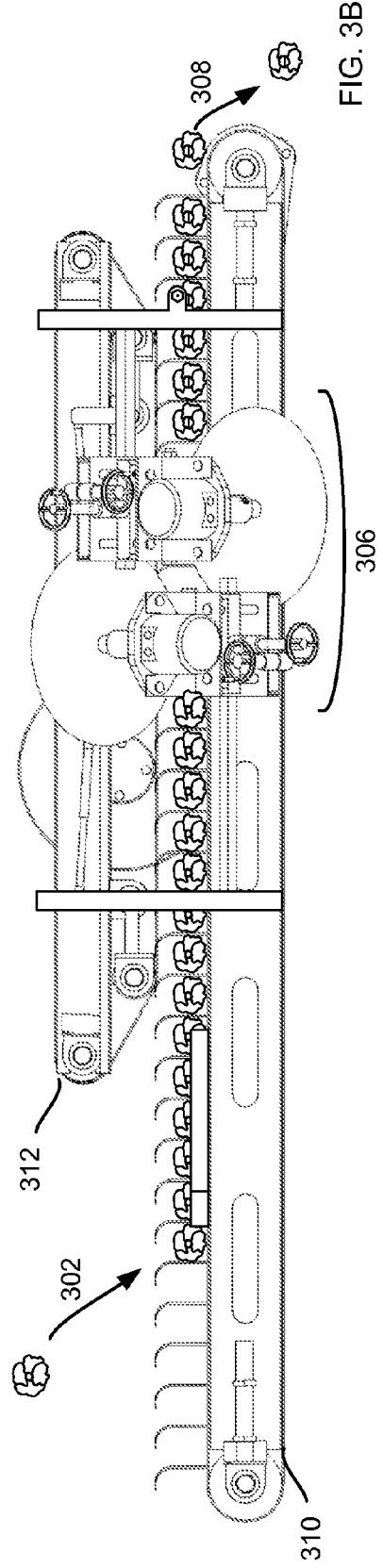

FIG. 2 is an illustrative flowchart 200 of methods for processing produce in accordance with embodiments of the present invention. FIG. 2 will be discussed with FIGS. 3A-B, which are illustrative representations of side views of a produce processing apparatus during processing in accordance with embodiments of the present invention and with FIG. 4, which is an illustrative representation of a unit of processed produce in accordance with embodiments of the present invention. At a first step 202, the method receives a severed produce head on a rotating conveyor system. A severed produce head may be received from automated harvesting machinery or from harvesting personnel without limitation. Referring briefly to FIGS. 3A-B and 4, a produce head 402 is received by rotating conveyor system 310 at or around location 302. As illustrated, each produce head is isolated. Returning to FIG. 2, at a next step 204, produce head is aligned. As noted above, produce processing apparatus embodiments may be configured with an alignment bar for aligning a produce head in order to properly and accurately process the produce. In some embodiments alignment may be manually achieved by operators.

At a next step 206, the severed head may be captured by a counter-rotating compression belt system (see 312, FIGS. 3A-B). As noted above, counter-rotating compression belt systems may be configured to move synchronously with conveyor systems. Synchronous movement ensures that produce may be stabilized for processing. However, in some embodiments, asynchronous movement may be desired when processing requires some rotation of the produce. At a next step 208, the method determines whether to reject a severed produce head. As noted above, optical detection systems may be utilized in some embodiments to detect viability of produce. In some embodiments, produce may be inspected by an operator. Therefore, if the method determines at a step 208 to reject a severed produce head, the method continues to a step 210 to eject the severed produce head from the conveyor system whereupon the method ends. If the method determines at a step 208 not to reject a severed produce head, the method continues to a step 212 to transport the severed produce head through a cutting system.

At a next step 214, the method trims the severed produce head (see 304, FIGS. 3A-B; 404 FIG. 4). Trimming, as utilized herein removes a top portion of a head. The removed portion is called cull. Trimming may be adjustably configured to remove any amount of cull from the severed head depending on production requirements. Typically, processing removes only portions that may be unsightly or undesirable to a consumer. In some embodiments, trimming removes additional cull by making an angled cut to remove a side portion with respect to the top of the severed head. At a next step 216, the method cores the severed produce head (see 306, FIGS. 3A-B; 406 FIG. 4). Coring, as utilized herein, refers to removal of a bottom portion of the head. As above, the removed portion is called cull. Coring may be adjustably configured to remove any amount of cull from the severed head depending on production requirements. In some embodiments, a core may be removed leaving a "V" shaped cut. In other embodiments, a core may be removed leaving a straight cut. In still other embodiments, a core may be removed leaving a semi-arcuate or arcuate cut. As noted above, rotating blades, as illustrated here, may have some advantages over other methods of processing because blades may be easily serviced to provide clean coring and trimming. In some embodiments, rotating blades may further include a safety shroud in order to provide a safe working environment for operators of produce processing apparatus. However, in some embodiments, other methods of coring and trimming may be utilized. For example, in some embodiments, a linear action blade, a static blade, a metal wire blade, a laser blade, and a water blade may be utilized without departing from the present invention.

It may be appreciated that trimming and coring requirements may depend in part upon the type of produce being processed. As noted above, a number of types of produce may be processed utilizing methods described herein. For example, in embodiments, produce such as a romaine lettuce head, an iceberg lettuce head, a butterhead lettuce head, a summertime lettuce head, a cabbage head, a bok choy head, an escarole lettuce head, a radicchio lettuce heat, a broccoli head, a cauliflower head, a broccoflower head, a celery bunch, and a carrot bunch may be processed without limitation.

At a next step 218, the method rinses a trimmed and cored produce head. It may be appreciated that rinsing produce after processing may be desirable to remove cull or other debris such as insects and soil. Thus, any rinse system known in the art may be utilized without departing from the present invention. In addition, any type of rinse may be utilized including a water rinse, a saline rinse, a chemical rinse, and an air rinse without departing from the present invention. At a next step 220, the method determines whether to reject a trimmed and cored produce head. As noted above, optical detection systems may be utilized in some embodiments to detect viability of produce. In some embodiments, produce may be inspected by an operator. Therefore, if the method determines at a step 220 to reject a trimmed and cored produce head, the method continues to a step 222 to eject the trimmed and cored produce head from the conveyor system whereupon the method ends. If the method determines at a step 220 not to reject a trimmed and cored produce head, the method continues to a step 224 to release the trimmed and cored produce head to a collection point.

Additional Embodiments

Figure 6A:
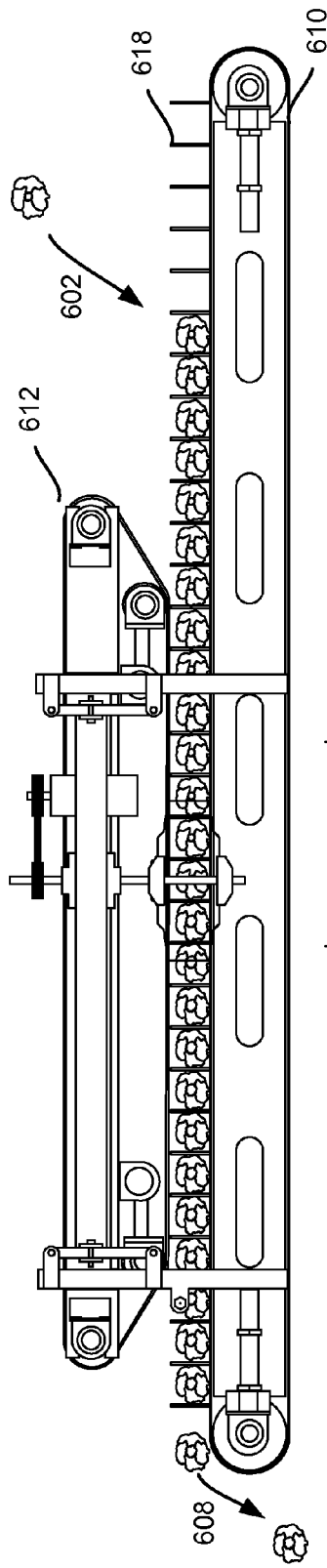
FIGS. 6 A-B are illustrative representations of side views of a produce processing apparatus during processing in accordance with embodiments of the present.
Figure 7:
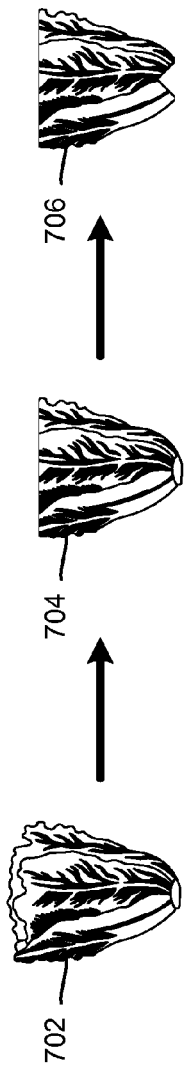
FIG. 7 is an illustrative representation of a unit of processed produce in accordance with embodiments of the present invention.
Figure 6B:
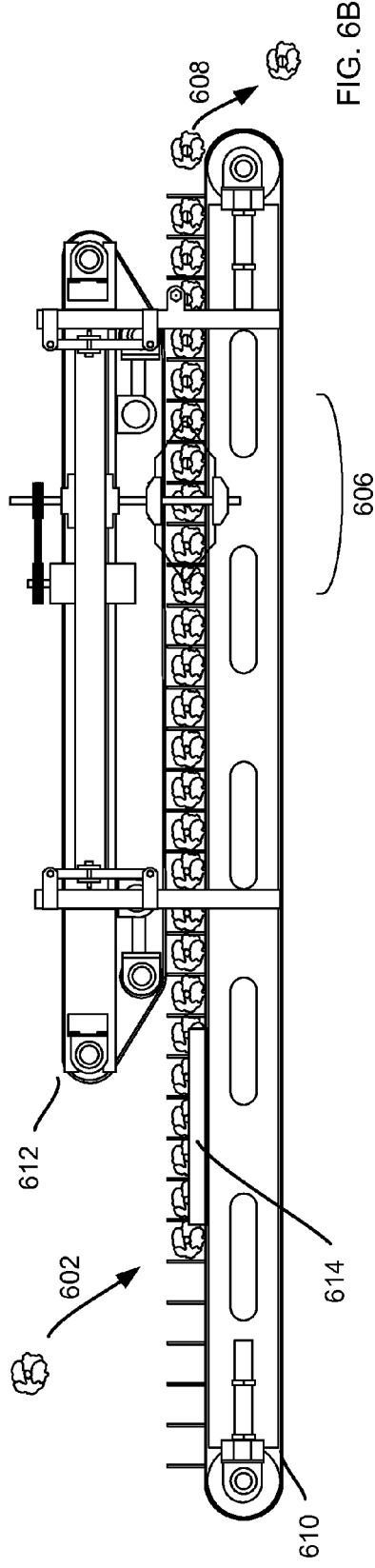

As noted above, FIG. 2 is an illustrative flowchart 200 of methods for processing produce in accordance with embodiments of the present invention. FIG. 2 will now be discussed with FIGS. 6A-B, which are illustrative representations of side views of a produce processing apparatus during processing in accordance with embodiments of the present invention and with FIG. 7, which is an illustrative representation of a unit of processed produce in accordance with embodiments of the present invention. At a first step 202, the method receives a severed produce head on a rotating conveyor system. A severed produce head may be received from automated harvesting machinery or from harvesting personnel without limitation. Referring briefly to FIGS. 6A-B and 7, a produce head 702 is received by rotating conveyor system 610 at or around location 602. As illustrated, each produce head is isolated by a number of paddles 618. Returning to FIG. 2, at a next step 204, produce head is aligned. As noted above, produce processing apparatus embodiments may be configured with an alignment bar 614 for aligning a produce head in order to properly and accurately process the produce. In some embodiments alignment may be manually achieved by operators.

At a next step 206, the severed head may be compressed by a counter-rotating compression belt system (see 612, FIGS. 6A-B) by applying a compressive force to a severed produce so that the severed produce is secured without damaging the severed produce. As noted above, counter-rotating compression belt systems may be configured to move synchronously with conveyor systems. Synchronous movement ensures that produce may be stabilized for processing. However, in some embodiments, asynchronous movement may be desired when processing requires some rotation of the produce. At a next step 208, the method determines whether to reject a severed produce head. As noted above, optical detection systems may be utilized in some embodiments to detect viability of produce. In some embodiments, produce may be inspected by an operator. Therefore, if the method determines at a step 208 to reject a severed produce head, the method continues to a step 210 to eject the severed produce head from the conveyor system whereupon the method ends. If the method determines at a step 208 not to reject a severed produce head, the method continues to a step 212 to transport the severed produce head through a cutting system.

At a next step 214, the method trims the severed produce head (see 604, FIGS. 6A-B; 704 FIG. 7). Trimming, as utilized herein removes a top portion of a head utilizing a rotary trimming blade assembly in embodiments. The removed portion is called cull. Trimming may be adjustably configured to remove any amount of cull from the severed head depending on production requirements. Typically, processing removes only portions that may be unsightly or undesirable to a consumer. In some embodiments, trimming removes additional cull by making an angled cut to remove a side portion with respect to the top of the severed head. At a next step 216, the method cores the severed produce head (see 606, FIGS. 6A-B; 706 FIG. 7). Coring, as utilized herein, refers to removal of a bottom portion of the head utilizing a rotary coring blade assembly in embodiments. As above, the removed portion is called cull. Coring may be adjustably configured to remove any amount of cull from the severed head depending on production requirements. In some embodiments, a core may be removed leaving a "V" shaped cut. In other embodiments, a core may be removed leaving a straight cut. In still other embodiments, a core may be removed leaving a semi-arcuate or arcuate cut. As noted above, rotating rotary blades, as illustrated here, may have some advantages over other methods of processing because blades may be easily serviced to provide clean coring and trimming. In some embodiments, rotating rotary blades may further include a safety shroud in order to provide a safe working environment for operators of produce processing apparatus.

It may be appreciated that trimming and coring requirements may depend in part upon the type of produce being processed. As noted above, a number of types of produce may be processed utilizing methods described herein. For example, in embodiments, produce such as a romaine lettuce head, an iceberg lettuce head, a butterhead lettuce head, a summertime lettuce head, a cabbage head, a bok choy head, an escarole lettuce head, a radicchio lettuce heat, a broccoli head, a cauliflower head, a broccoflower head, a celery bunch, and a carrot bunch may be processed without limitation.

At a next step 218, the method rinses a trimmed and cored produce head. It may be appreciated that rinsing produce after processing may be desirable to remove cull or other debris such as insects and soil. Thus, any rinse system known in the art may be utilized without departing from the present invention. In addition, any type of rinse may be utilized including a water rinse, a saline rinse, a chemical rinse, and an air rinse without departing from the present invention. At a next step 220, the method determines whether to reject a trimmed and cored produce head. As noted above, optical detection systems may be utilized in some embodiments to detect viability of produce. In some embodiments, produce may be inspected by an operator. Therefore, if the method determines at a step 220 to reject a trimmed and cored produce head, the method continues to a step 222 to eject the trimmed and cored produce head from the conveyor system whereupon the method ends. If the method determines at a step 220 not to reject a trimmed and cored produce head, the method continues to a step 224 to release the trimmed and cored produce head to a collection point.

Figure 8A:
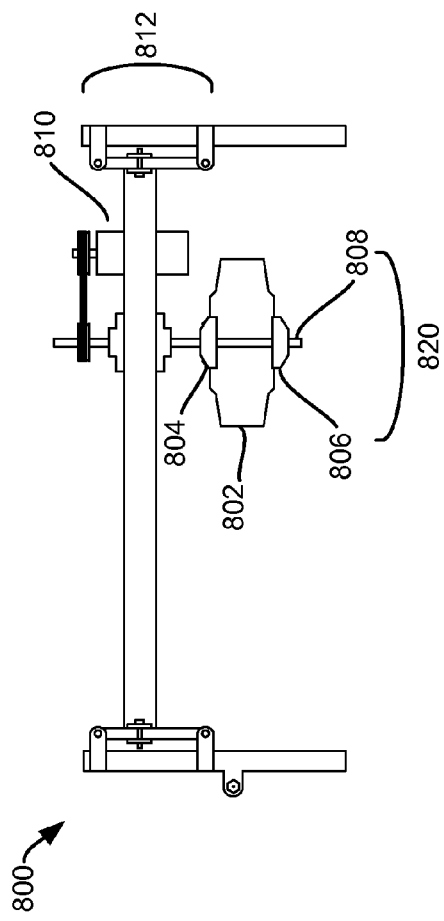
FIGS. 8 A-B are illustrative representations of side views of a cutting system in accordance with embodiments of the present invention.
Figure 9:
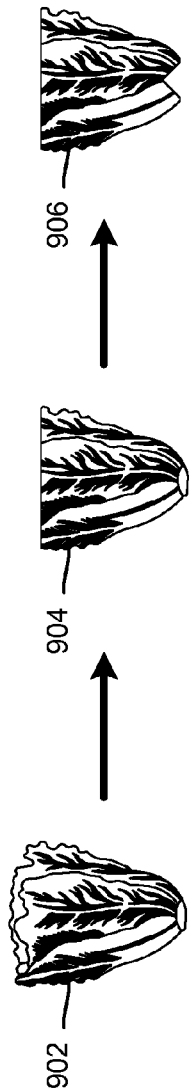
FIG. 9 is an illustrative representation of a unit of processed produce in accordance with embodiments of the present invention.
Figure 8B:
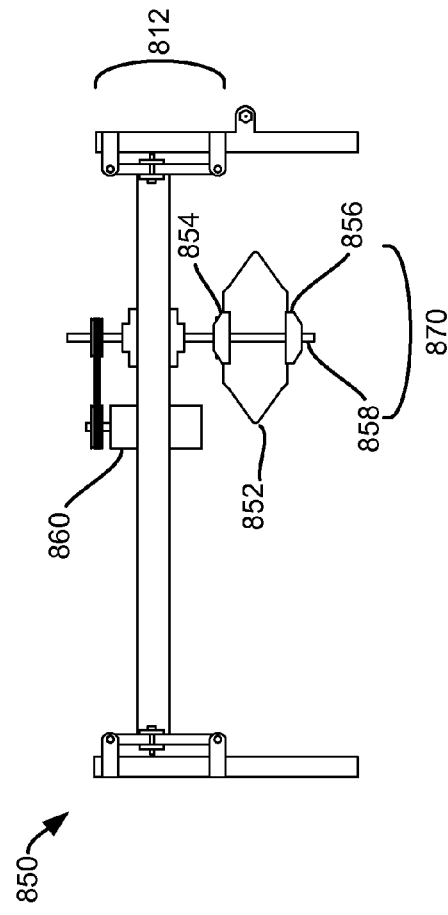

In order to more clearly illustrate embodiments of the present invention, FIGS. 8 A-B, which are illustrative representations of side views of a cutting system in accordance with embodiments of the present invention are presented. In particular, FIGS. 8A-B illustrate selected portions of FIGS. 6A-B. In addition, FIG. 9, which is an illustrative representation of a unit of processed produce in accordance with embodiments of the present invention, is presented. As illustrated in FIG. 8A, cutting system 800 includes rotary trimming blade assembly 820 positioned along a path of the rotating conveyor system, which assembly includes trimming blade 802 mechanically coupled with rotatable trimming shaft 808 by proximal attachment point and distal attachment point 806. In embodiments, one or more trimming blade may be utilized. In embodiments, utilizing a single trimming blade, a trimming counterweight may be coupled with the rotatable trimming shaft for balancing the cutting system. Additionally, as illustrated, two similar trimming blade shapes may be utilized. However, trimming blades may also include dissimilar and complementary blade shapes. Example trimming blade shapes will be discussed in further detail below for FIG. 10. Because different trimming blade shapes may be configured, resulting trimming shapes may include, without limitation, a vee shape, an arcuate shape, a semi-arcuate shape, a rectangular shape, and a semi-rectangular shape in embodiments. In embodiments, trimming blades are configured to remove a top portion of produce 904 (FIG. 9).

Further, as illustrated, trimming drive 810 may be coupled with rotatable trimming shaft 808 for driving trimming blade 802 through a rotational path. Any number of drives may be utilized in embodiments including an internal combustion engine, an electric motor, a compressed air motor, a hydraulic fluid motor, a wind turbine motor, and a power take off (PTO) motor. In addition, in embodiments, mechanical coupling may be accomplished utilizing a belt drive (illustrated), a gear drive, a chain drive, and a direct drive. Further, in embodiments, trimming drive 810 may be configured to rotate trimming blade in a range of approximately 50 to 10000 RPM. Cutting system 800 may include vertical adjustment 812 for adjusting the height of trimming blade 802 with respect to produce 902 (FIG. 9) being processed.

As illustrated in FIG. 8B, cutting system 850 includes rotary coring blade assembly 870 positioned along a path of the rotating conveyor system, which assembly includes coring blade 852 mechanically coupled with rotatable coring shaft 858 by proximal attachment point and distal attachment point 856. In embodiments, one or more coring blade may be utilized. In embodiments, utilizing a single coring blade, a coring counterweight may be coupled with the rotatable coring shaft for balancing the cutting system. Additionally, as illustrated, two similar coring blade shapes may be utilized. However, coring blades may also include dissimilar and complementary blade shapes. Example coring blade shapes will be discussed in further detail below for FIG. 10. Because different coring blade shapes may be configured, resulting coring shapes may include, without limitation, a vee shape, an arcuate shape, a semi-arcuate shape, a rectangular shape, and a semi-rectangular shape in embodiments. In embodiments, coring blades are configured to remove a bottom portion of produce 906 (FIG. 9).

Further, as illustrated, coring drive 810 may be coupled with rotatable coring shaft 858 for driving coring blade 852 through a rotational path. Any number of drives may be utilized in embodiments including an internal combustion engine, an electric motor, a compressed air motor, a hydraulic fluid motor, a wind turbine motor, and a power take off (PTO) motor. In addition, in embodiments, mechanical coupling may be accomplished utilizing a belt drive (illustrated), a gear drive, a chain drive, and a direct drive. Further, in embodiments, coring drive 860 may be configured to rotate coring blade in a range of approximately 50 to 10000 RPM. Cutting system 850 may include vertical adjustment 862 for adjusting the height of coring blade 852 with respect to produce 902 (FIG. 9) being processed.

Figure 11:
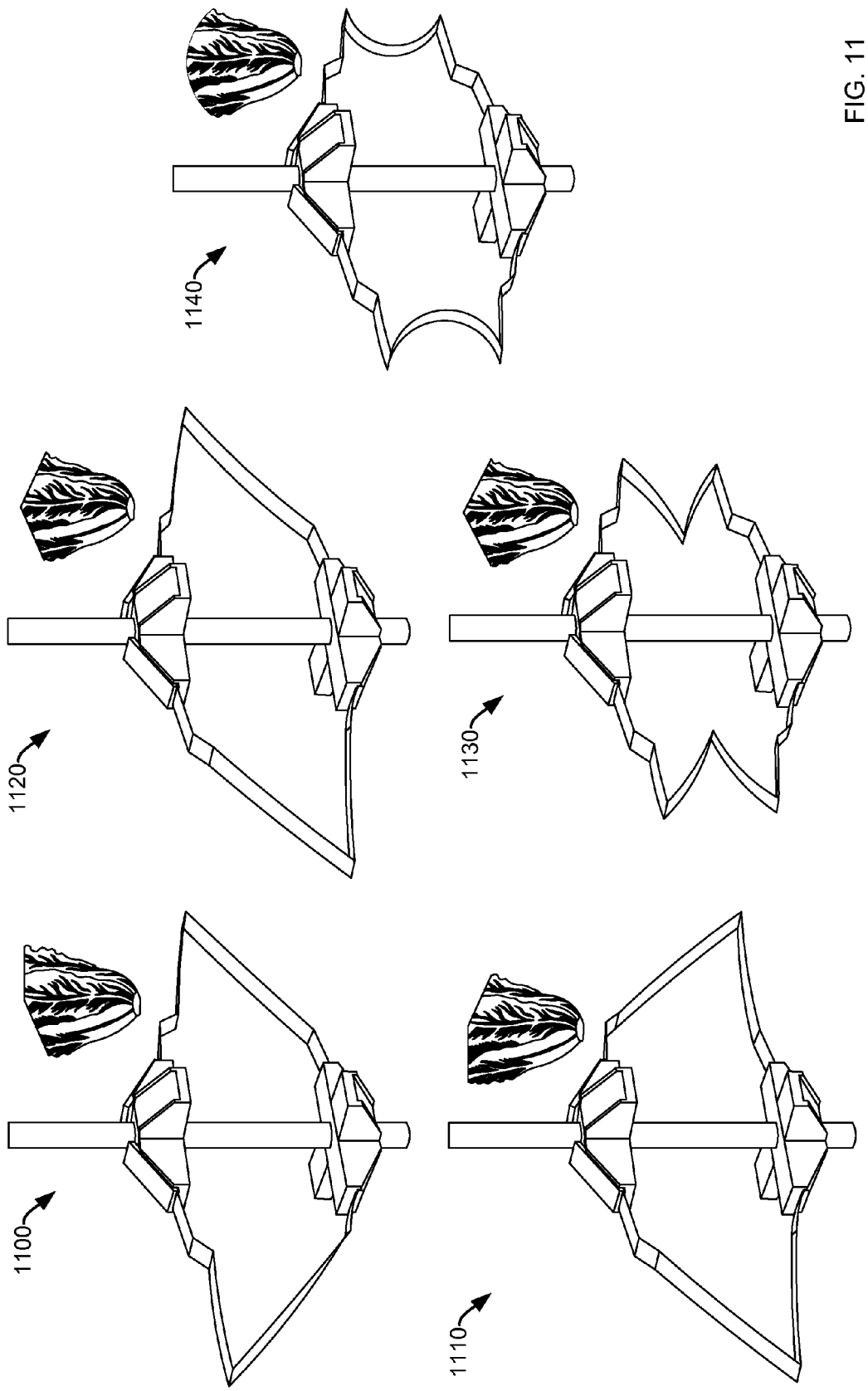
FIG. 11 is an illustrative representation of trimming blade assemblies in accordance with embodiments of the present invention.

FIG. 10 are illustrative representations of coring and trimming blade assemblies in accordance with embodiments of the present invention. As contemplated by embodiments described herein, coring and trimming blade assemblies are substantially similar in function. That is, removing a portion of produce. While the assemblies are similar in function, they may differ in form as may be seen in the illustrated embodiments. As such, the description provided for rotary coring blade assembly 1010 may be equally applied to assemblies 1100 to 1140 (FIG. 11). The illustrated embodiments are provided for clarity in various examples, but should not be construed as limiting. Indeed, any number of forms for blade assemblies may be utilized without departing from embodiments provided herein. Indeed, as illustrated, two similar blade shapes may be utilized. However, blades may also include dissimilar and complementary blade shapes. Because different blade shapes may be configured, resulting coring shapes may include, without limitation, a vee shape, an arcuate shape, a semi-arcuate shape, a rectangular shape, and a semi-rectangular shape in embodiments.

As illustrated, rotary coring blade assembly 1010 includes rotatable coring shaft 1022, which shaft rotates about axis of rotation 1028. Coupling members 1014 and 1016 may be configured for receiving at least one coring blade. As illustrated in one embodiment, two coring blades may be attached with coupling members. Coupling member 1014 includes proximal attachment point 1012 which may include a clamping mechanism for easy assembly and removal of coring blade 1020. In some embodiments attachment may be effected by bolting, riveting, or welding without limitation. Likewise coupling member 1016 includes distal attachment point 1018 which may include a clamping mechanism for easy assembly and removal of coring blade 1020. Coring blade 1020 may be configured with coring blade edge 1024, which edge may be aligned along a core blade leading edge. As may be seen from direction of rotation 1026, core blade edge may contact produce 1034 to produce a coring shape 1032 thereby coring the produce. As noted above, in embodiments, coring shapes may include a vee shape, an arcuate shape, a semi-arcuate shape, a rectangular shape, and a semi-rectangular shape. In addition, as is well known in the food processing arts, it is generally desirable to utilize materials that are easily cleaned and sterilized. As such, in embodiments, coring blades may be manufactured from stainless steel compositions, epoxy resin compositions, and polymeric compositions without limitation.

As illustrated, rotary trimming blade assembly 1040 includes rotatable trimming shaft 1052, which shaft rotates about axis of rotation 1058. Coupling members 1044 and 1046 may be configured for receiving at least one trimming blade. As illustrated in one embodiment, two trimming blades may be attached with coupling members. Coupling member 1044 includes proximal attachment point 1042 which may include a clamping mechanism for easy assembly and removal of trimming blade 1050. In some embodiments attachment may be effected by bolting, riveting, or welding without limitation. Likewise coupling member 1046 includes distal attachment point 1048 which may include a clamping mechanism for easy assembly and removal of trimming blade 1050. Trimming blade 1050 may be configured with trimming blade edge 1054, which edge may be aligned along a trim blade leading edge. As may be seen from direction of rotation 1056, trim blade edge may contact produce 1064 to produce a trimming shape 1062 thereby trimming the produce. As noted above, in embodiments, trimming shapes may include a vee shape, an arcuate shape, a semi-arcuate shape, a rectangular shape, and a semi-rectangular shape. In addition, as is well known in the food processing arts, it is generally desirable to utilize materials that are easily cleaned and sterilized. As such, in embodiments, trimming blades may be manufactured from stainless steel compositions, epoxy resin compositions, and polymeric compositions without limitation.

FIG. 11 is an illustrative representation of trimming blade assemblies in accordance with embodiments of the present invention. As illustrated, rotary trimming blade assembly 1100 provides a diagonal shape for a produce, which shape may be formed across a produce or across a portion of a produce (illustrated). Likewise rotary trimming blade assembly 1110 provides a diagonal shape for a produce, which shape may be formed across a produce or across a portion of a produce (illustrated). Further as illustrated, trimming blade assemblies 1120 and 1130 may produce a vee shape. Rotary trimming blade assembly 1120 represents two complimentary blades which may result in a complimentary trim shape. Still further as illustrated, trimming blade assembly 1140 may produce an arcuate shape. In other embodiments, trim shapes may include without limitation a semi-arcuate shape, a rectangular shape, and a semi-rectangular shape. In some examples, rotary coring blade assemblies and rotary trimming blade assemblies may be interchangeable. As noted above, embodiments may be utilized to process a variety of produce including, a romaine lettuce head, an iceberg lettuce head, a butterhead lettuce head, a summertime lettuce head, a cabbage head, a bok choy head, an escarole lettuce head, a radicchio lettuce heat, a broccoli head, a cauliflower head, a broccoflower head, a celery bunch, and a carrot bunch without limitation.

Figure 12:
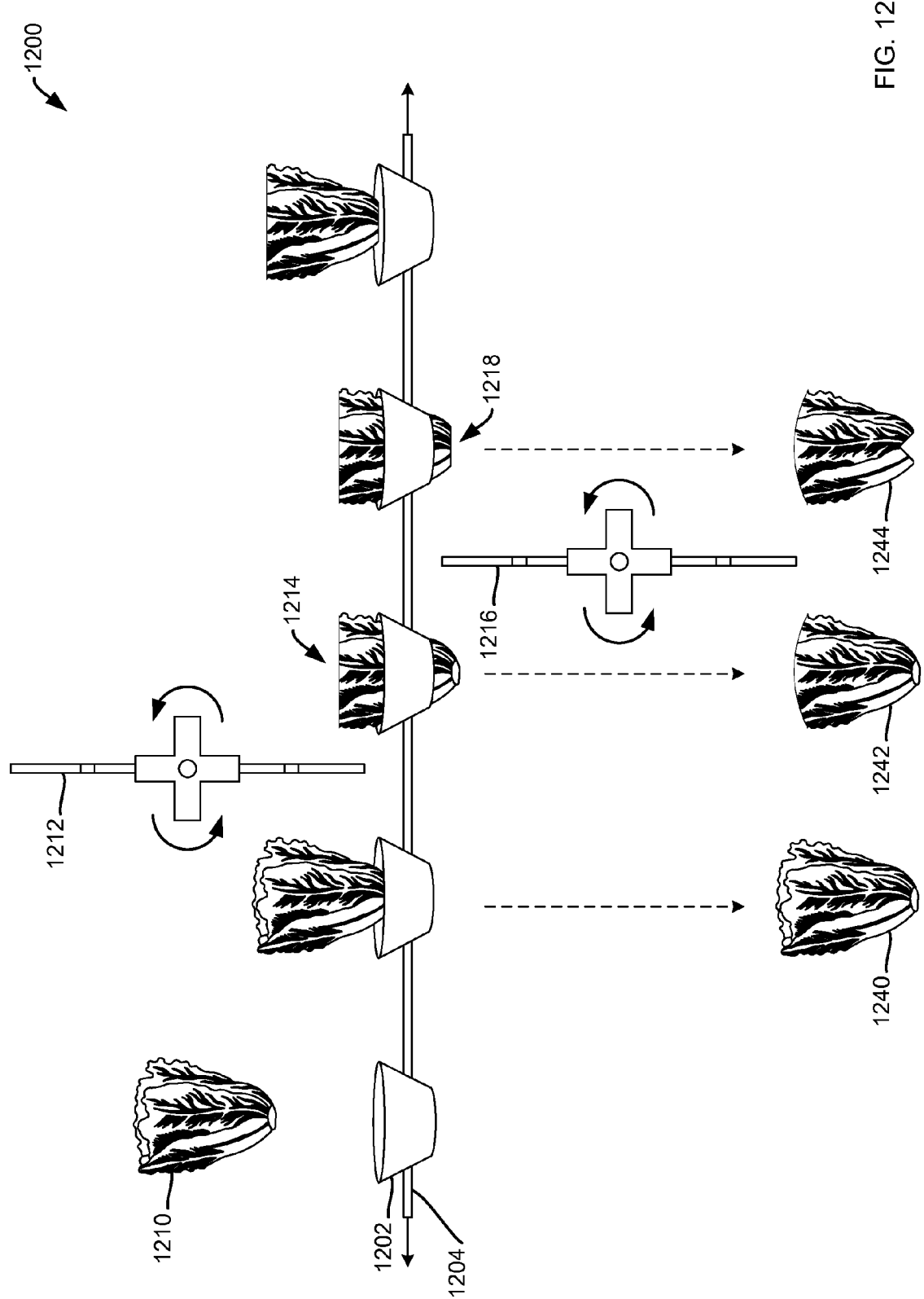
FIG. 12 is an illustrative representation of coring and trimming blade assemblies in accordance with embodiments of the present invention.

As may be appreciated, alternative conveyance methods may be utilized with coring and trimming blade assemblies as disclosed above without departing from embodiments disclosed herein. For example, FIG. 12 is an illustrative representation 1200 of coring and trimming blade assemblies in accordance with embodiments of the present invention. As noted above, conveyances utilizing compression systems may be configured to convey and secure produce without damaging tender portions of the produce. An alternative method of conveyance may include the utilization of annular cups. As utilized herein, the term annular cup refers generally to an annular surface tapered and sized to secure produce during processing. In some embodiments, annular cups may have a circular cross-sectional profile. In other embodiments, cross-sectional profiles include a triangular cross-section, a rectangular cross-section, a pentagonal cross-section, a hexagonal cross-section, and an ovate cross-section. As illustrated, annular cup 1202 may be utilized to secure produce 1210. A number of annular cups may be attached with belt 1204, which may be driven by any means known in the art without departing from embodiments disclosed herein. In some embodiments, a linkage such as a chain or other flexible member may be utilized without limitation. An illustrative representation of produce 1240 is illustrated, which representation is rotated 90° with respect to produce 121.0 for clarity.

Once produce is secured, annular cups may be conveyed across a path such that produce is brought into contact range of trimming blade assembly 1212, which assembly makes trim 1214 thereby creating a trim shape. In embodiments, trimming shapes may include a vee shape, an arcuate shape, a semi-arcuate shape, a rectangular shape, and a semi-rectangular shape. An illustrative representation of trimmed produce 1242 is illustrated, which representation is rotated 90° with respect to produce 1210 for clarity. Once produce is trimmed, annular cups may be conveyed across a path such that produce is brought into contact range of coring blade assembly 1216, which assembly makes core 1218 thereby creating a core shape. In embodiments, coring shapes may include a vee shape, an arcuate shape, a semi-arcuate shape, a rectangular shape, and a semi-rectangular shape. An illustrative representation of trimmed produce 1244 is illustrated, which representation is rotated 90° with respect to produce 1210 for clarity. It may be noted that although the illustrated apparatus trims first, then cores, embodiments may further include coring first and then trimming or may accomplish trimming and coring at the same time. Furthermore, in the configuration illustrated, produce is positioned vertically with respect to the path of processing. In other embodiments, produce may be rotated to the horizontal with respect to the path of processing whereby coring and trimming apparatuses may be horizontally mounted as in FIGS. 8A and 8B.

Figure 13:
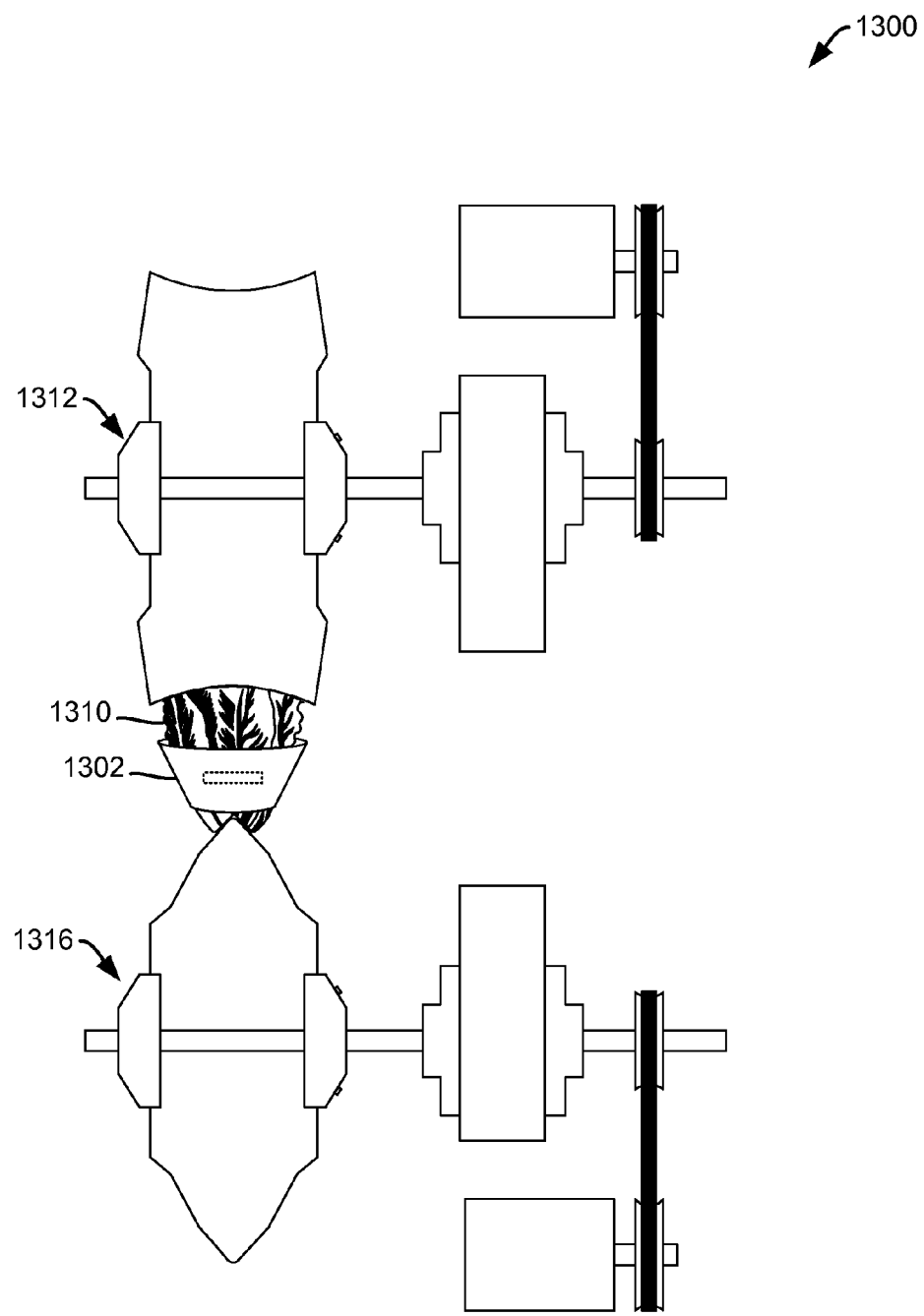
FIG. 13 is an illustrative representation of coring and trimming blade assemblies in accordance with embodiments of the present invention.

In order to more clearly illustrate an embodiment as depicted in FIG. 12, FIG. 13 is an illustrative representation 1300 of coring and trimming blade assemblies in accordance with embodiments of the present invention. In particular, FIG. 13 is a 90° rotation of FIG. 12. Thus, as may be seen produce 1310 is secured by annular cup 1302. Once produce is secured, annular cups may be conveyed across a path such that produce is brought into contact range of trimming blade assembly 1312 and coring blade assembly 1316. As illustrated, embodiments remove a portion of produce prior to packaging or further processing. In the illustration, trimming and coring blade assemblies include a belt driven mechanism, however, as above, any drive mechanism may be utilized in embodiments without limitation. As such, any number of drives may be utilized in embodiments including an internal combustion engine, an electric motor, a compressed air motor, a hydraulic fluid motor, a wind turbine motor, and a power take off (PTO) motor. In addition, in embodiments, mechanical coupling may be accomplished utilizing a belt drive (illustrated), a gear drive, a chain drive, and a direct drive.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. For example, trimming and coring may be performed in any order without departing from the present invention. Still further, optical scanning of produce may be performed at any stage during production. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A produce processing apparatus comprising:
a plurality of paddles coupled with a rotating conveyor system, the plurality of paddles configured for capturing and securing produce along a first position of the rotating conveyor system;
a counter-rotating compression belt system for compressing the produce along a second position of the rotating conveyor system, wherein
the counter-rotating compression belt system is configured to apply a compressive force to the produce such that the produce is secured between the rotating conveyor system and
the counter-rotating compression belt system without damaging the produce, and wherein the counter-rotating compression belt system includes a belt that is counter rotating and synchronized with respect to the rotating conveyor system; and
a cutting system comprising a rotary coring blade assembly positioned along a path of the rotating conveyor system, wherein the rotary coring blade assembly further comprises:
at least two coring blades, the at least two coring blades each including a core blade edge aligned along a middle portion of each of the at least two coring blades, wherein the middle portion is formed to provide a first coring shape to core the produce, and wherein each of the at least two coring blades further include,
a first proximal attachment point positioned along a proximal end of each of the at least two coring blades for attaching each of the at least two coring blades with a rotatable coring shaft that rotates about an axis of rotation, wherein the first proximal attachment point removeably couples with the rotatable coring shaft by a first coupling member; and
a first distal attachment point positioned along a distal end of each of the at least two coring blades for attaching each of the at least two coring blades with the rotatable coring shaft wherein the first distal attachment point removeably couples with the rotatable coring shaft by a second coupling member such that each of the at least two coring blades is positioned parallel with the rotatable coring shaft, wherein, each of the at least two coring blades are coupled with the rotatable coring shaft, wherein
each of the at least two coring blades define a void with respect to the rotatable coring shaft, and wherein
the rotary coring blade assembly is positioned and configured to core the produce along a third position of the rotating conveyor system.

2. The apparatus of claim 1, wherein the cutting system further comprises:
a coring drive in mechanical communication with the rotatable coring shaft for driving the at least two coring blades through a rotational path.

3. The apparatus of claim 1, further comprising:
a coring counterweight coupled with the rotatable coring shaft for balancing the cutting system when only one coring blade is utilized.

4. The apparatus of claim 1, wherein the first coring shape and the second coring shape is a shape selected from the group consisting of: a vee shape, an arcuate shape, a semi-arcuate shape, a rectangular shape, and a semi-rectangular shape.

5. The apparatus of claim 1, further comprising:
a rotary trimming blade assembly positioned along the path of the rotating conveyor system, the rotary trimming blade assembly including,
at least one trimming blade, wherein the at least one trimming blade further comprises:
at least one trim blade edge aligned along a trim blade leading edge of a second portion of the at least one trimming blade, wherein the second portion is formed to provide a first trimming shape to trim the produce,
a second proximal attachment point for attaching the at least one trimming blade with a rotatable trimming shaft, and
a second distal attachment point for attaching the at least one trimming blade with the rotatable trimming shaft, wherein the rotatable trimming shaft comprises a plurality of coupling members for securing the at least one trimming blade at the second proximal attachment point and the second distal attachment point.

6. The apparatus of claim 2, wherein the cutting system further comprises:
a trimming drive in mechanical communication with the rotatable trimming shaft for driving the at least one trimming blade through a rotational path.

7. The apparatus of claim 6, wherein the coring drive and the trimming drive are selected from the group consisting of an internal combustion engine, an electric motor, a compressed air motor, a hydraulic fluid motor, a wind turbine motor, and a power take off (PTO) motor, wherein the trimming drive is configured to rotate trimming blade in a range of approximately 50 to 10000 RPM.

8. The apparatus of claim 5, further comprising:
a trim counterweight coupled with the rotatable trimming shaft for balancing the cutting system when only one trimming blade is utilized.

9. The apparatus of claim 5, wherein the first trimming shape and the second trimming shape is a shape selected from the group consisting of: a vee shape, an arcuate shape, a semi-arcuate shape, a rectangular shape, and a semi-rectangular shape.

10. The apparatus of claim 1, further comprising:
a rinse system along a fourth position for rinsing a trimmed and cored produce, wherein the rinse system includes a rinse selected from the group consisting of: a water rinse, a saline rinse, a chemical rinse, and an air rinse.

11. The apparatus of claim 1, further comprising:
a first optical detection device along the first position for detecting viability of the produce, the optical detection device configured to function in coordination with a first produce rejection system along the first position, wherein the produce is removed from the rotating conveyor system if the produce is not viable.

12. The apparatus of claim 1, further comprising:
a second optical detection device along fourth position for detecting viability of the produce, the optical detection device configured to function in coordination with a second produce rejection system wherein the produce is removed from the rotating conveyor system if the produce is not viable.

13. A produce processing apparatus comprising:
a plurality of annular cups coupled with a rotating conveyor system configured for capturing and securing produce along a first position of the rotating conveyor system; and
a cutting system comprising,
a rotary coring blade assembly positioned along a path of the rotating conveyor system, wherein the rotary coring blade assembly is positioned and configured to core the produce along a second position of the rotating conveyor system, wherein the rotary coring blade assembly further comprises:
- at least two coring blades, the at least two coring blades each including a core blade edge aligned along a middle portion of each of the at least two coring blades, wherein the middle portion is formed to provide a first coring shape to core the produce, and wherein each of the at least two coring blades further include,
- a first proximal attachment point positioned along a proximal end of each of the at least two coring blades for attaching each of the at least two coring blades with a rotatable coring shaft that rotates about an axis of rotation, wherein the first proximal attachment point removeably couples with the rotatable coring shaft by a first coupling member, and
- a first distal attachment point positioned along a distal end of each of the at least two coring blades for attaching each of the at least two coring blades with the rotatable coring shaft wherein the first distal attachment point removeably couples with the rotatable coring shaft by a second coupling member such that each of the at least two coring blades is positioned parallel with the rotatable coring shaft, wherein, the at least two coring blades are coupled with the rotatable coring shaft, wherein each of the at least two coring blades define a void with respect to the rotatable coring shaft, and
- a rotary trimming blade assembly positioned along the path of the rotating conveyor system, wherein the rotary trimming blade assembly is positioned and configured to core the produce along a third position of the rotating conveyor system.

14. The apparatus of claim 13, wherein the rotary trimming blade assembly further comprises:
- at least one trim blade edge aligned along a trim blade leading edge of a second portion of the at least one trimming blade, wherein the second portion is formed to provide a trimming shape to trim the produce,
- a second proximal attachment point for attaching the at least one trimming blade with a rotatable trimming shaft that rotates about an axis of rotation, and
- a second distal attachment point for attaching the at least one trimming blade with the rotatable trimming shaft such that the at least one trimming blade is positioned parallel with the rotatable coring shaft, wherein the rotatable trimming shaft comprises a plurality of coupling members for securing the at least one trimming blade at the second proximal attachment point and the second distal attachment point.

15. The apparatus of claim 13, wherein the coring shape and the trimming shape is a shape selected from the group consisting of: a vee shape, an arcuate shape, a semi-arcuate shape, a rectangular shape, and a semi-rectangular shape.

\* \* \* \* \*